*(12)* United States Patent
Schulz et al.

(10) Patent No.: US 10,033,534 B2
(45) Date of Patent: Jul. 24, 2018

(54) METHODS AND APPARATUS TO PROVIDE FOR EFFICIENT AND SECURE SOFTWARE UPDATES

(71) Applicant: INTEL CORPORATION, Santa Clara, CA (US)

(72) Inventors: Steffen Schulz, Darmstadt (DE); Rafael Misoczki, Hillsboro, OR (US); Manoj R. Sastry, Portland, OR (US); Jesse Walker, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 254 days.

(21) Appl. No.: 14/955,255

(22) Filed: Dec. 1, 2015

(65) Prior Publication Data

US 2017/0155514 A1 Jun. 1, 2017

(51) Int. Cl.
*H04L 9/32* (2006.01)
*G06F 8/65* (2018.01)
*H04L 29/06* (2006.01)
*H04L 9/14* (2006.01)
*H04L 9/30* (2006.01)
*G06F 21/00* (2013.01)

(52) U.S. Cl.
CPC .......... *H04L 9/3247* (2013.01); *G06F 8/65* (2013.01); *H04L 9/14* (2013.01); *H04L 9/304* (2013.01); *H04L 63/06* (2013.01)

(58) Field of Classification Search
CPC ............ H04L 9/3281; H04N 21/8358; H04N 1/32144

USPC ......................................................... 713/176
See application file for complete search history.

(56) References Cited

U.S. PATENT DOCUMENTS

| | | | |
|---|---|---|---|
| 6,976,163 B1 * | 12/2005 | Hind | G06F 21/572 713/1 |
| 2004/0107349 A1 | 6/2004 | Sasselli et al. | |
| 2010/0070772 A1 | 3/2010 | Nakamura et al. | |
| 2011/0113181 A1 * | 5/2011 | Piwonka | G06F 8/65 711/102 |
| 2015/0180662 A1 | 6/2015 | Cui et al. | |

OTHER PUBLICATIONS

Wikipedia, "Digital signature", From Wikipedia, the free encyclopedia, Retrieved on Oct. 22, 2015, 10 pages.
(Continued)

*Primary Examiner* — Evans Desrosiers
(74) *Attorney, Agent, or Firm* — Barnes & Thornburg LLP

(57) ABSTRACT

In a method for validating software updates, a data processing system contains a current version of a software component. The data processing system saves at least first and second current advance keys (AKs). After saving the current AKs, the data processing system receives an update package for a new version of the software component. The data processing system extracts a digital signature and two or more new AKs from the update package. The data processing system uses at least one current AK to determine whether the digital signature is valid. In response to a determination that the digital signature is valid, the data processing system uses a software image from the update package to update the software component, and the data processing system saves the new AKs, for subsequent utilization as the current AKs. Other embodiments are described and claimed.

21 Claims, 4 Drawing Sheets

(56) References Cited

OTHER PUBLICATIONS

Hulsing, et al., "Hash-based Signatures: An Outline for a New Standard", NIST Workshop on Cybersecurity in a Post-Quantum World, 2015, 12 pages.
Pereira, et al., "Shorter hash-based signatures", The Journal of Systems and Software, 2015, 6 pages.
Garfinkel, et al., "Johnny 2: A User Test of Key Continuity Management with S/MIME and Outlook Express", 2005, 12 pages.
Wikipedia, "Lamport signature", Wikipedia, the free encyclopedia, Retrieved on Oct. 22, 2015, 5 pages.
International Search Report and Written Opinion received for PCT Patent Application No. PCT/US2016/059629, dated Feb. 20, 2017, 16 pages.

* cited by examiner

METHODS AND APPARATUS TO PROVIDE FOR EFFICIENT AND SECURE SOFTWARE UPDATES

TECHNICAL FIELD

This disclosure pertains to the updating of software in a data processing system. For example, this disclosure describes methods for efficiently and securely updating software, as well as apparatus to practice those methods.

BACKGROUND

Technological advances have made it possible to make very small data processing systems, and to make them very inexpensively. In addition, many such data processing systems are capable of communicating with each other and with other, more expensive data processing systems. Consequently, it has become possible to embed (or attach, or otherwise link) data processing systems with many different kinds of physical objects, thereby allowing for centralized monitoring and management of those physical objects.

As currently defined by the online encyclopedia known by the trademark WIKIPEDIA, the "Internet of Things (IoT)" is a "network of physical objects or 'things' embedded with electronics, software, sensors, and network connectivity, which enables these objects to collect and exchange data. The [IoT] allows objects to be sensed and controlled remotely across existing network infrastructure, creating opportunities for more direct integration between the physical world and computer-based systems, and resulting in improved efficiency, accuracy and economic benefit. Each thing is uniquely identifiable through its embedded computing system but is able to interoperate within the existing Internet infrastructure . . . 'Things,' in the IoT sense, can refer to a wide variety of devices such as heart monitoring implants, biochip transponders on farm animals, electric clams in coastal waters, automobiles with built-in sensors, . . . field operation devices that assist firefighters in search and rescue operations[,] smart thermostat systems and washer/dryers that use Wi-Fi for remote monitoring."

For purposes of this disclosure, a data processing systems that is embedded or otherwise linked with a "thing" to be managed or monitored may be referred to as a field node. Field nodes within the IoT typically have very limited amounts of storage, and limited communications bandwidth. Field nodes may also have very limited power budgets. Consequently, it can be difficult to securely upgrade the software in those field nodes.

As described in greater detail below, the present disclosure introduces methods for efficiently and securely updating software in field nodes and other data processing systems, as well as apparatus to practice those methods.

DESCRIPTION OF EMBODIMENTS

Figure 1:
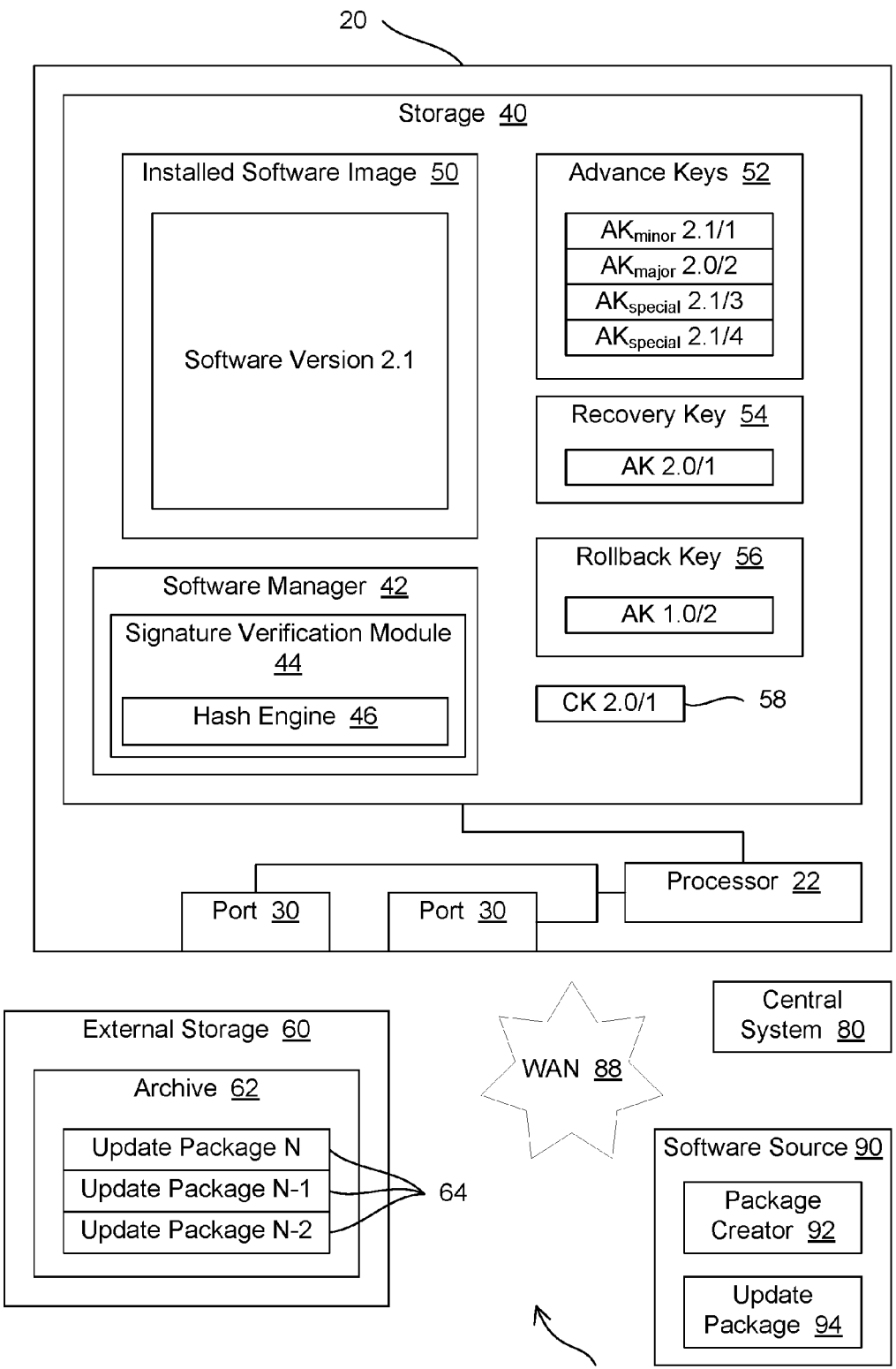
FIG. 1 is a block diagram of an example data processing system with technology for using efficiently and securely updating software.

For purposes of this disclosure, the term "secure update" refers to a process that a device uses to validate a software module that was supplied by a remote party before the device installs and executes that software module. For a secure update, the device typically authenticates the software using either (a) an asymmetric standard signature scheme such as the Elliptic Curve Digital Signature Algorithm (ECDSA) or Rivest, Shamir, and Adleman (RSA) signature verification or (b) a symmetric authentication scheme such as distributing the software module with a keyed-hash message authentication code (HMAC) checksum. However, on low-cost/low-end devices, asymmetric standard signature schemes may be prohibitively expensive in terms of code footprint or in terms of other resources. One example type of low cost device is a system-on-a-chip (SoC). Some low-end SoCs may also be referred to as microcontrollers or microcontroller units (MCUs). Asymmetric standard signature schemes may be prohibitively expensive on a typical MCU. Furthermore, symmetric authentication schemes may require previously shared secret keys among the target platforms. But pairwise shared secrets scale poorly for large infrastructures, as it becomes difficult to enable broadcasting while at the same time maintaining end-to-end security.

The present disclosure describes a secure update process that addresses both code footprint and scalability issues for resource constrained IoT devices and other data processing systems. That process uses hash-based one-time signatures (HB-OTSs), with cryptographically secure hash functions used for both signing and verification.

The process of the present disclosure may be implemented with update management software that occupies a much smaller footprint than that required to implement other secure update techniques. For instance, the code footprint for verifying signatures according to the present disclosure may be approximately one-twelfth the size required to implement secure update signature verification according to the RSA or elliptic curve cryptography (ECC) models. Further, since the process of the present disclosure uses an asymmetric signature scheme, it avoids the scalability issues inherent to symmetric schemes.

In HB-OTS, for a given public/private key pair, the private key can only sign a single message. Until now, that limitation has presented a major obstacle to practical application of HB-OTS for secure update. As described in greater detail below, to overcome that obstacle, the present disclosure presents a secure update mechanism that includes a key provisioning scheme to allow the use of one-time signatures (OTSs). That key provisioning mechanism may ensure sufficient fresh keys to perform updates securely.

According to one embodiment, devices use a key provisioning flow in which new keys are continuously deployed as part of the flow of secure software updates. For instance, in one scenario, before the software provider creates an update package for version 1.1 of a software image, the software provider creates a new private/public key pair to be used for signing the next version (e.g., version 1.2) of that software. The software provider may then include the public key for version 1.2 as part of the update package for version 1.1. In other words, the software provider may provide the target device with keys for future software updates in advance of sending those software updates to the target device. For purposes of the present disclosure, the term "advance key" or "AK" denotes a key for a software update that a software provider delivers to a target device before delivering that software update to the target device. In addition, when an AK is part of a key pair, the other key in the pair may also be referred to as an AK. Also, such a key pair may be referred to collectively as an AK.

Accordingly, in the scenario of the preceding paragraph, the public key for version 1.2 may be referred to as a public AK, and the private key counterpart may be referred to as a private AK. When the target device installs the version 1.1 image, the target device may also save the public AK. Subsequently, when the software provider creates the update package for version 1.2 of the software image, the software provider may use the private AK to sign the version 1.2 update package. In addition, the software provider may also include a copy of the corresponding public AK in the update package. That public AK (i.e., the public AK that corresponds to the private key which was used to sign the package) may be referred to as the current key (CK). Before installing the version 1.2 image, the target device may compare the AK that was saved in conjunction with installing version 1.1 against the CK, to determine whether the version 1.2 package actually came from the expected software provider. In addition, the target device may use the CK to validate the signature on the version 1.2 update package.

In another embodiment, instead of including a full blown AK in the update package, to save space the software provider includes a hash of the AK. Accordingly, the target device may save the hash of the AK. And the target device may subsequently hash the CK to determine whether that result matches the saved hash of the AK. As described in greater detail below, other embodiments may use variations of the above process to validate update packages using AKs. For purposes of this disclosure, terms like "advance key" and "AK" may be used to refer to full blown keys, as well as to values which represent those keys, such as hash values based on full blown AKs, depending on context.

Secure update mechanisms of the kind described herein may integrate efficient variants of OTS. This kind of approach enables significant cost reduction in terms of resources such as implementation code size and computation time (which also affects power consumption), both of which are critical on low-end/low-cost design points as memory, computation time, and power consumption are typically at a premium.

Various embodiments with various different levels of complexity are described below. One relatively simple embodiment provides for a strictly sequential update flow. In other words, the field node can only upgrade from a given version (N) to the next version (N+1). In that embodiment, the field node need only save one AK at a time, and the software update need only include one AK. As indicated above, the software provider typically does not know exactly what later software revisions will contain. In other words, the content for version 1.1 is not known when version 1.0 is released. And an OTS should only be used to sign a single message. However, as described above, additional keys may be distributed in advance to ensure a secure update flow beyond the first version (e.g., beyond version 1.0). The software provider does so by generating a new key pair $AK_{N+1}$ when creating (signing) secure update image revision N and including the new public key part (or hash thereof) of $AK_{N+1}$ as part of the signed image N. When the field node receives the signed new image N, the field node performs the following operations:
1. validates the signature using its current key $AK_N$, which was supplied in the previous image N−1 (and possibly using a corresponding CK from the update package N);
2. applies the included software update image N; and then
3. stores the included new $AK_{N+1}$, to be used for validating the next update image N+1.

The software provider enables the field node to perform these operations by including at least the following information into every software update image N:
1. the update image version N;
2. the public key part of the $K_N$ which was used to sign the current update image N (also known as the CK); and
3. The (hash of the) public key part of the next key $K_{N+1}$, which will be used to sign the next image N+1.

Also, the software provider signs all three pieces of information using the same private key that was used to sign version N.

The initial software version (e.g., version 1.0) and the initial keys associated with that version may be deployed to the field node through a separate mechanism, such as a JTAG interface. Alternatively, the very first software image verification may simply skip the signature verification for user convenience. Alternatively, as described above, the field node may be supplied in advance with an initial AK to be used for validating the initial software version.

According to one example that follows the approach described herein, to attain a 128-bit security level, a signature verification module may be implemented with a code size of 0.5 kilobytes (KB), and that signature verification module may complete signature verification in 58 milliseconds (ms) when executed on a data processing system with a 32 megahertz (MHz) processor. In particular, those results may be obtained using the SoC distributed by Intel Corporation under the trademark QUARK as the data processing system, where the SoC includes a 32 MHz processing core, and by using a modified version of the signature scheme referred to as "Winternitz one-time signatures" by the article entitle "Shorter hash-based signatures" by Geovandro C. C. F. Pereira et al. By contrast, to attain a similar security level on the same hardware with an RSA-2048 implementation may require a code size of 6 KB and an execution time of 172 ms. And to attain the same security level on the same hardware with an ECC-256 implementation may require a code size of 3 KB and an execution time of 2,174 ms. For each of these three implementations, the respective signature verification module uses an additional cryptographic hash function or secure hash algorithm (SHA) such as SHA-256, which may occupy an additional footprint of about 1.6 KB. In addition, since the overall flow for secure update is relatively simple according to the present disclosure, these savings in signature verification directly translate into savings for the overall implementation.

Further, hash-based signature schemes are classified as post-quantum secure, in contrast to schemes such as RSA and ECC cryptosystems, which are susceptible to attacks mounted with the help of quantum computers. Accordingly, the approach of the present disclosure should survive quantum threats that could defeat other approaches.

FIG. 1 is a block diagram of an example data processing environment 10 with data processing systems that include technology for efficiently and securely updating software. Data processing environment 10 may also be referred to as a distributed data processing system 10. In the embodiment of FIG. 1, the data processing systems within data processing environment 10 which feature technology for efficiently and securely updating software include a field node 20 and a software source 90. Field node 20 may serve as a node in the IoT, and software source 90 may provide field node 20 with secure software updates. For instance, software source 90 may use a package creator 92 to create each update package 94. Data processing environment 10 may also include a central system 80 that receives reports from field node 20.

Field node 20 includes storage 40 that contains an installed software image 50. For purposes of illustration, field node 20 is described herein as being deployed primarily for the purpose of monitoring weather conditions, and software image 50 enables field node 20 to serve that purpose. In other words, software image 50 includes instructions which enable field node 20 to detect weather conditions and to report those conditions to central system 80. Software image 50 may also be referred to as application software or as user software.

Field node 20 also includes a processing core or processor 22 in communication with storage 40, as well as one or more ports 30 in communication with processor 22. Ports 30 may enable field node 20 to communicate with other devices, such as external storage 60, central system 80, and software source 90. For instance, field node 20 may include a network port, a universal serial bus (USB) port, and/or any other suitable type of port. Software image 50 may use a network port to communicate with central system 80 via a local area network, a wide area network (WAN) 88, or any other suitable network or combination of networks. Similarly, field node 20 may receive software updates from software source 90 via a network port. Central system 80 and software source 90 may also be referred to as remote data processing systems.

And, as described in greater detail below, field node 20 may copy old software updates to an archive 62 in external storage 60 via a USB port. In other embodiments, field nodes may use any other suitable types of ports to communicate with external devices.

Also, in some embodiments, the software manager may reside at least partially in a separate data processing system, such as a management device. The management device may perform some or all of the functions that are performed by software manager 42 in the embodiment of FIG. 1. For instance, the management device may manage the MCU by holding an archive of update images and administrating the desired image via USB, WAN, or other types of connections.

As indicated above, in the embodiment of FIG. 1, software source 90 may send updates for software image 50 to field node 20. In the embodiment of FIG. 1, field node 20 uses a software manager 42, a signature verification module 44, and a hash engine 46 from storage 40 to process those updates, as described in greater detail below. In other embodiments, the hash engine and/or other components may be implemented differently. For example, a field node may include a security engine or a security controller that implements the hash engine in hardware.

Figure 2:
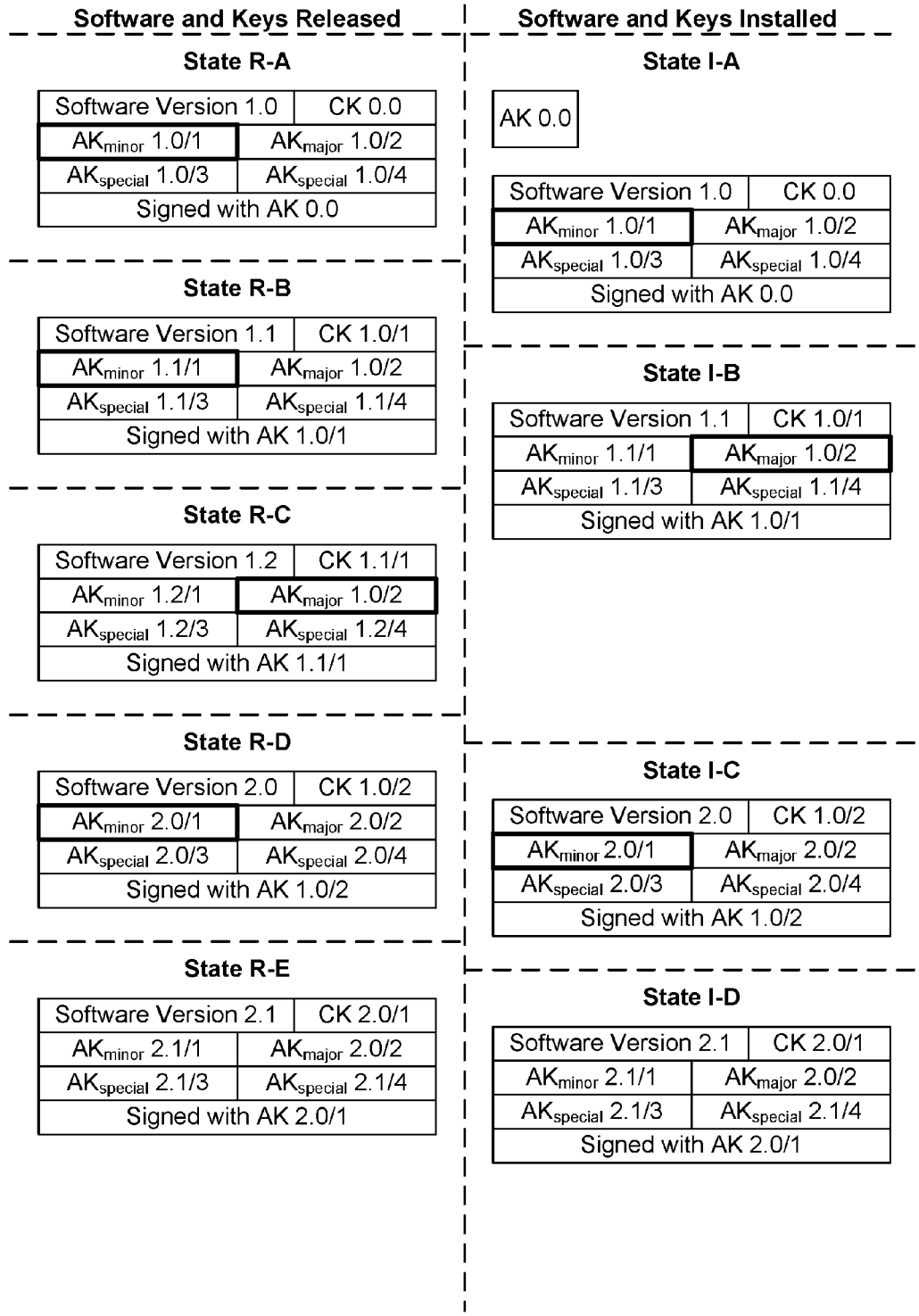
FIG. 2 is a sequence diagram showing a sequence of update packages according to one embodiment.

FIG. 2 is a sequence diagram showing a sequence of update packages according to one embodiment. In particular, in the left column, FIG. 2 depicts a sequence of update packages released by software source 90. In the right column, FIG. 2 depicts a corresponding sequence of update packages installed in field node 20 (although one update is skipped by field node 20 in the scenario of FIG. 2, as described in greater detail below).

Each of the update packages in FIG. 2 is identified by a particular state for software source 90 or field node 20. For instance, in the left column, the first package is identified as "State Release A" or "State R-A" for software source 90, and the second package is identified as "State R-B" for software source 90. Similarly, in the right column, the first package is identified as "State Installed A" or "State I-A" for field node 20, and the second package is identified as "State I-B" for field node 20. Also, as shown, each update package includes a software image with a particular version, such as "Software Version 1.0."

Each package also includes a digital signature that was created by the software provider using a private AK. (As indicated above, the software provider creates new private/public key pairs and sends those public keys to the target device in advance.) For instance, State R-B indicates that the update package for software version 1.1 is "Signed with AK 1.0/1." In other words, the software provider signs the update package for software version 1.1 using (the private key component of) AK 1.0/1. And as shown in bold outline in State R-A, (the public key component of) AK 1.0/1 was previously delivered to field node 20 with the update package for software version 1.0.

However, as indicated above, to save space, the AKs may be provided as hash values. Consequently, to enable field node 20 to verify the signature, the software provider may also include the CK in the update package, where the CK is the full expression of the public key part of the AK that was used to sign the update. For instance, in State R-B, CK 1.0/1 is the full public key counterpart to the private key that the software provider used to sign the update package for software version 1.1, and the hash of that public key was previously distributed (with software version 1.0) as $AK_{minor}$ 1.0/1.

However, before field node 20 installs any software updates, field node 20 may be provisioned with one or more AKs for one or more software providers. For instance, as shown in State I-A, field node 20 may be provisioned with a hashed AK 0.0 for the software provider that will use software source 90 to send updates to field node 20. In addition, the software provider may use (the private component of) that AK to sign the initial installation package for version 1.0. When version 1.0 of the application software is initially installed, field node 20 may use AK 0.0 to validate the version 1.0 package. For instance, field node 20 may hash CK 0.0 from the software version 1.0 update package in State I-A and compare that result against AK 0.0, and if those values match field node 20 may use CK 0.0 to verify the digital signature on the software version 1.0 package. And if the signature is good (i.e., if the verification process indicates that the signature was created with the private key counterpart of CK 0.0), field node 20 may install software version 1.0, and field node 20 may save the AKs from the software package.

In the embodiment of FIG. 2, the initial installation package and the software update packages each contain four AKs. In other embodiments, packages may include one, two, three, or more than four AKs (or hashes of AKs). In the embodiment of FIG. 2, the four AKs include
- an $AK_{minor}$ value, to be used for minor releases or updates, such as a "1.1" update;
- an $AK_{major}$ value, to be used for major releases or updates, such as a "2.0" update; and
- two $AK_{special}$ values, to be used for special purposes.

As described in greater detail below, those special purposes may include, for example, skipping a bad release, or delegating or transferring update privileges to a new software provider. As described in greater detail below, when field node 20 receives a software update, it may compare the CK from that update with all of the AKs, to determine whether the update came from the trusted software provider.

Furthermore, in some embodiments, hash-based values (e.g., a a hash tree or a Merkle tree) may be used as the public key format. In those embodiment, the full expression of an AK may include hashed values. Consequently, the hash of such an AK may be a hash of one or more hashes, such as hash(hash( ),hash( )). Thus, an AK may be stored as hash(hash(AK)), for instance.

FIG. 1 also depicts a scenario in which field node 20 saves four AKs 52. In addition, as described in greater detail below, field node 20 may save a recover key 54 and a rollback key 56. And when verifying an update package, as described in greater detail below, signature verification module 44 may extract the CK from that package into CK 58 before hashing that CK.

Referring again to FIG. 2, in the illustrated scenario, as shown in the left column, the software provider has released 5 software packages: the initial package for installation of version 1.0 of the software image, and 4 software updates, including the minor updates (versions 1.1, 1.2. and 2.1), and one major update (version 2.0). Three of the AKs change with each update. However, the AK major only changes when a major version is released. Thus, the packages for versions 1.0, 1.1, and 1.2 all include an $AK_{major}$ of 1.0/2. And the packages for versions 2.0 and 2.1 both include an $AK_{major}$ of 2.0/2.

As shown in the right column, field node 20 has only installed four of those packages. In particular, field node 20 skipped the package for version 1.2.

The rectangles with bold outlines highlight which AKs ended up getting used by the software provider to sign the next package. For instance, "$AK_{minor}$ 1.0/1" is shown with a bold outline in the package for software version 1.0 because the software provider ended up using that key (or the private counterpart for that key) to sign the next release (i.e., the update package for version 1.1). By contrast, in the package for software version 1.2, "$AK_{major}$ 1.0/2" is shown with a bold outline because the software provider ended up using that key (or the private counterpart for that key) to sign the next release (i.e., the update package for version 2.0).

The right column shows that, when field node 20 tested the hash of CK 1.0/2 to validate the update package for software version 2.0, that hash matched "$AK_{major}$ 1.0/2," which software manager 42 obtained from the update package for software version 1.1. Thus, even though field node 20 skipped version 1.2, it was still able to validate and install version 2.0.

Figure 3A:
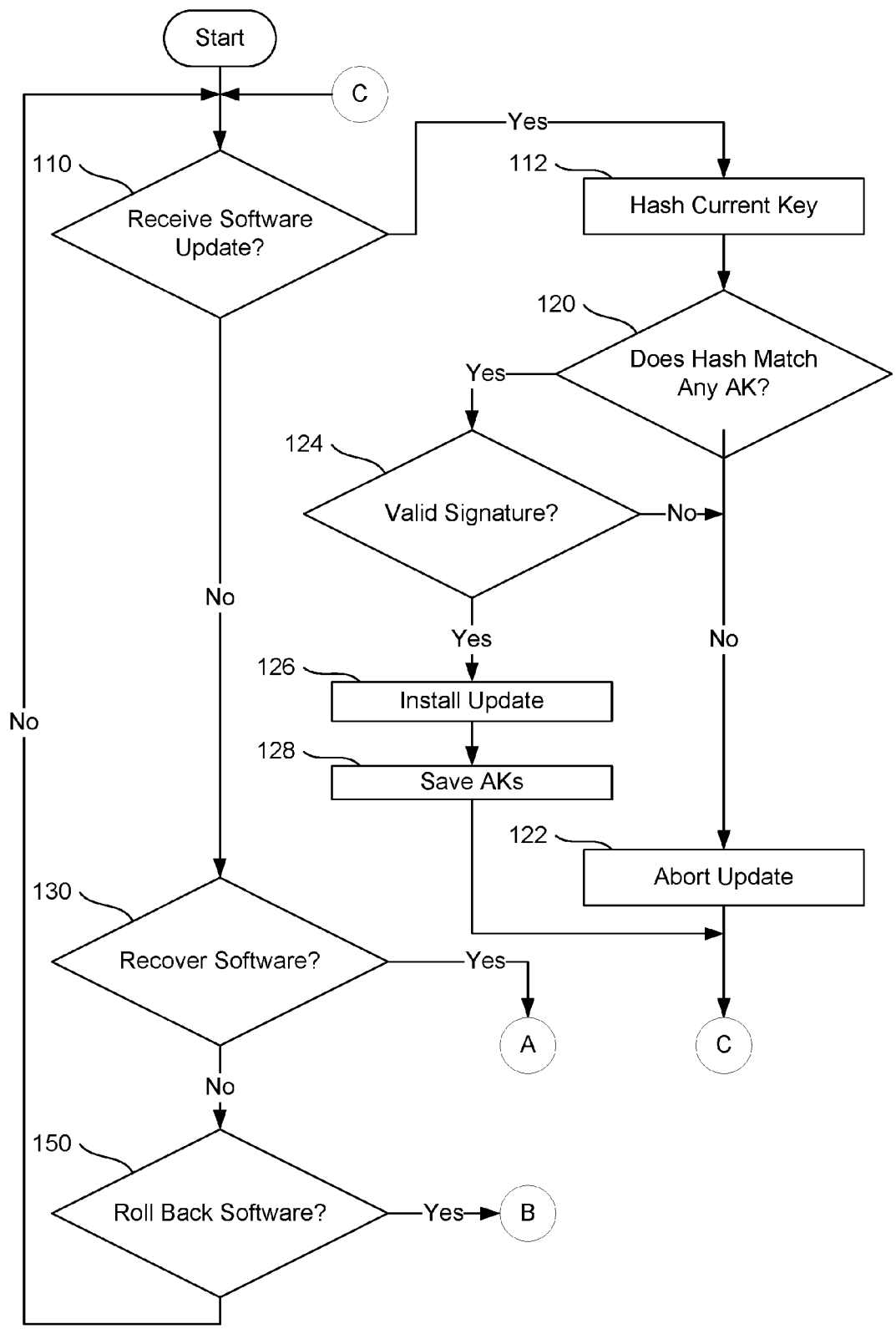
FIGS. 3A and 3B present a flowchart of an example process for efficiently and securely updating software.
Figure 3B:
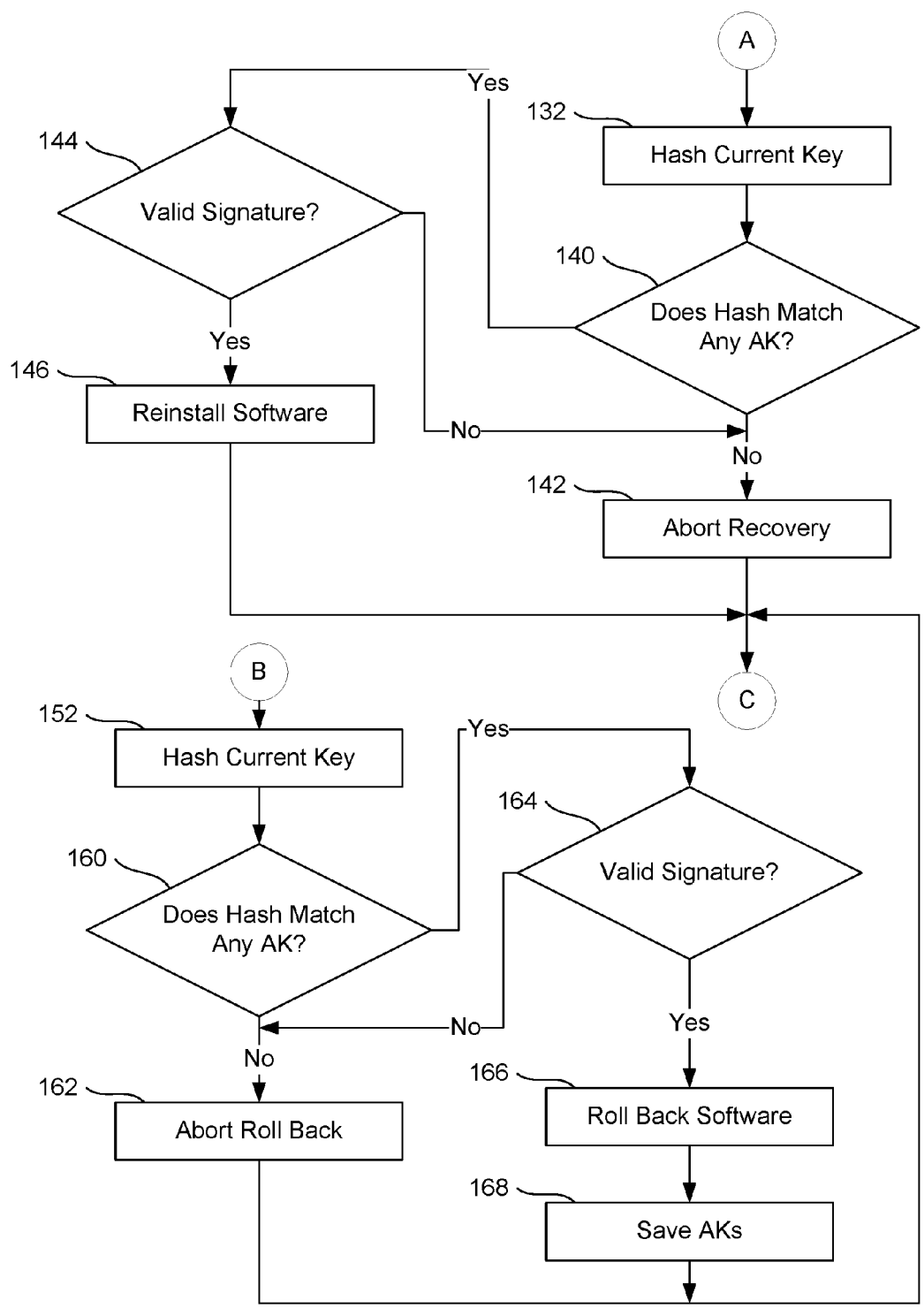

FIGS. 3A and 3B present a flowchart of an example process for efficiently and securely updating software. That process begins after AK 0.0, software version 1.0, and the AKs from the package for software version 1.0 have been installed on field node 20. (For the scenario of FIG. 2, as shown in State I-A, the AKs for software version 1.0 are $AK_{minor}$ 1.0/1, $AK_{major}$ 1.0/2, $AK_{special}$ 1.0/3, and $AK_{special}$ 1.0/4.)

As shown at block 110, software manager 42 in field node 20 may determine whether field node 20 has received a software update package. If an update has been received, software manager 42 may use signature verification module 44 to extract the CK from that package, and signature verification module 44 may use hash engine 46 to hash that CK, as shown at block 112. Signature verification module 44 may then determine whether the hash value matches any of the AKs. If the CK hash does not match any AKs, software manager 42 may abort the update process without installing the new software, as shown at block 122. However, if the CK hash does match an AK in storage 40, signature verification module 44 may then use the CK to validate the signature for the update, as shown at block 124. If the signature is invalid, software manager 42 may abort the update process without installing the new software, as shown at block 122. If the signature is valid, software manager 42 may install the software up and save the AKs from that update, as shown at blocks 126 and 128. The process may then return to block 110 via page connector C.

In addition, when saving the AKs during the installation process, software manager 42 may save (the hash of) the CK as recovery key 54. As described in greater detail below, software manager 42 may then use that recovery key 54 to reinstall the current version, i.e., the software update that was signed with the (private key counterpart of) that CK.

In addition, before updating recovery key 54 with the CK for the software update, software manager 42 may save the existing/old recovery key as rollback key 56. As described in greater detail below, software manager 42 may then use rollback key 56 to roll back software image 50 to the previous version.

For instance, FIG. 1 depicts a scenario in which field node 20 has installed software version 2.1. Accordingly, software manager 42 has saved the four AKs from the version 2.1 update package in AKs 52. As shown in State R-E and State I-D of FIG. 2, those AKs are $AK_{minor}$ 2.1/1, $AK_{major}$ 2.0/2, $AK_{special}$ 2.1/3, and $AK_{special}$ 2.1/4. In addition, software manager 42 has saved the hash of CK 2.0/1 (which is the same as AK 2.0/1) as recovery key 54. And software manager has saved AK 1.0/2 as the rollback key.

Referring again to FIG. 3A, if software manager 42 has not detected a software update, software manager 42 may determine whether field node 20 should recover the current version of the software. For instance, software manager 42 may determine that the current version should be recovered in response to failure cases such as repetitive platform resets, local user intervention, external commands, etc. If recovery is warranted, the process may pass through page connector A to FIG. 3B.

Signature verification module 44 may then retrieve the update package for the current version from archive 62, and signature verification module 44 may then hash the CK from that package, as shown at block 132. For instance, as shown in FIG. 1, if software manager 42 is recovering software version 2.1, signature verification module 44 may extract CK 2.0/1 as current key 58, and signature verification module 44 may use hash engine 46 to hash that key. As shown at block 140, signature verification module 44 may then determine whether that result matches any AKs in storage 40. If the update package for software version 2.1 has not been tampered with, that hash result should match recovery key 54. If the hash does not match any AK, software manager 42 may abort the process without reinstalling the software, as shown at block 142. If the hash matches an AK, software manager 42 may then use the CK to verify the signature on the package. If the signature is not valid, software manager 42 may abort the process without reinstalling the software, as shown at block 142. If the signature is valid, software manager 42 may reinstall the software image from that package, as shown at block 146. The process may then return to FIG. 3A via page connector C.

However, referring again to block 130, if recovery is not warranted, software manager 42 may determine whether it should roll back the software image to the immediately previous version, as shown at block 150. For instance, software manager 42 may determine that field node 20 should roll back to the previous version in response to failure cases such as repetitive platform resets, local user intervention, external commands, etc. If roll back is warranted, the process may pass through page connector B to FIG. 3B.

Signature verification module 44 may then retrieve the update package for the previous version from archive 62, and signature verification module 44 may then hash the CK from that package, as shown at block 152. For instance, as shown in FIG. 2, if software manager 42 is rolling back from software version 2.1 to version 2.0, signature verification module 44 may extract CK 1.0/2 as the current key, and signature verification module 44 may use hash engine 46 to hash that key. As shown at block 160, signature verification module 44 may then determine whether that result matches any AKs in storage 40. If the update package for software version 2.0 has not been tampered with, that hash result should match rollback key 56. If the hash does not match any AK, software manager 42 may abort the process without reinstalling the software, as shown at block 162. If the hash matches an AK, software manager 42 may then use the CK to verify the signature on the package. If the signature is not valid, software manager 42 may abort the process without rolling back the software, as shown at block 162. If the signature is valid, software manager 42 may (re)install the software image from that package, as shown at block 166. Consequently, software manager 42 may also load the AKs from the update package into AKs 52, and software manager 42 may copy the contents of rollback key 56 (e.g., AK 1.0/2) into recovery key 54. In other embodiments, the field node may save multiple rollback keys to enable more than one consecutive roll back.

In the embodiment of FIG. 3B, the process may then return to FIG. 3A via page connector C, with software manager 42 waiting for future updates and for recovery and rollback situations, as described above.

Thus, as has been described, the software updates include a variety of AKs, including an AK that may be used for a sequential update and an AK that may be used to skip one or more minor updates when jumping to the next major update.

Other embodiments may use simpler control logic and data structures to realize at least some of the benefits of the embodiment illustrated in FIGS. 2, 3A, and 3B. Alternative embodiments may nevertheless ensure that the required fresh keys are available to enable the respective signing and verification steps in a secure way. For instance, as indicated above, software updates may include a single AK, and field nodes may save that single AK, for use in a simple sequential update flow.

However, embodiments which include multiple AKs with each software update image enable field nodes to take shortcuts which can be freely defined by the signer. For example, an alternative embodiment includes two AKs with each update package, to provide for fast path updates which allow the field node to skip from the current software version (e.g., version 1.1) to the next major release (e.g., version 2.0) without installing one or more intermediate minor releases (e.g., version 1.2). All major releases (e.g., v1.0, v2.0) are arranged in a "fast-path" overall update sequence, while minor releases on top of each major release form a separate slow-paced update path (e.g., v1.1, v1.2). The slow-paced update path is restarted at every major release, and every minor and major release has an option to upgrade directly to the next major release.

This flow is enabled by including a second public key with every software image. This second public key is generated when releasing a major software image version, and it is identical for all subsequent minor releases, until it changes with the next major release. The purpose of the second public key is to verify the signature on the next major release, once that release becomes available. This enables any software revision to upgrade directly to the next major release, and then continue through the fast-paced major release or slow-paced minor-release chain until the latest software revision has been applied. This embodiment only requires two public keys to be transmitted and stored at the receiver at any particular time (e.g., $AK_{minor}$ and $AK_{major}$), and only a single signature on any particular update image.

Furthermore, as indicated above, the field node can save old/used AKs to provide for recovery of the current software image and/or rollback to a previous software image. Since any particular update image version is signed with a different private key generated at the signer/distributor/software provider, the present scheme is implicitly secure against version rollback attacks (where an adversary may attempt to apply a prior image with known security vulnerabilities). However, in some cases a version rollback is desired to recover from severe bugs introduced with a new revision. In one case, the software provider may support an official/signed rollback. In another case, the field node may initiate local rollback.

For an official signed rollback, the software provider wants to release an update image which reverts the last released software version to a prior, known-good version. For this case, the software provider cannot simply redistribute the earlier known-good package, because its CK will not verify based on the currently deployed AK, and the included AKs may have already been used to sign other update images. But the software provider can simply take the old software revision and embed it into a new update image with new AKs, and then sign the package as usual with a previously supplied AK.

For a local rollback, the field node may save old AKs, as indicated above. For instance, the user may require a local rollback capability which can be performed independently of the signer, in case the user discovers grave software bugs after updating the software. To support this capability, the field node that receives secure update image version N+2 (for example) may additionally store the last and second-to-last AKs (e.g., public keys $AK_{N+1}$ and $AK_N$, respectively) that were used to verify the last and last and second-to-last update images. The field node may save those AKs in addition to the AKs in the last update image. For instance, as shown in FIG. 2, in addition to storing AKs 52, field node 20 may store the last AK as recovery key 54, and the second-to-last AK as rollback key 56. This enables the local platform to not only accept new published images signed with AKs such as $AK_{minor}$ and $AK_{major}$, but also to (1) re-apply the currently deployed image N+2 by verifying it against the last public key $AK_{N+1}$, and to (2) perform a local rollback to the previously applied image $K_{N+1}$ by verifying it against the locally stored second-to-last $K_N$.

The present teachings also enable the software provider to skip a bad release, as might be desired in case a software version is found to have serious bugs after it has been (more or less) released. The software provider may then want to essentially withdraw a particular published update and replace it with a fixed version, thereby possibly enabling the most platforms in the field to skip the broken release and directly update to that fixed version. The present teachings provide this kind of functionality by including one or more extra AKs (such as $AK_{special}$) in all update images. Normally the field node will not need the extra AK. But the software provider always includes it in the update package, and the software provider may use the special AK to recover from unintended releases, to recover from the signing of incorrect data, to recover from running out of verification keys in general, or for other special purposes.

The software provider may use the approach described herein to sign and distribute any kind of software image, including images supplied by third parties, such as independent software vendors (ISVs). However, in some cases there may be a requirement to re-provision some or all managed field nodes or endpoints with a new software image that follows a different release cycle or that is owned or managed by a separate entity. Providing a new software image that follows a different release cycle may be referred to as branching. Providing a new software image that is owned by a separate entity may be referred to as delegation.

According to the present teachings, the original software provider may use a special AK to sign a software image that branches off into a different release cycle. The software provider may distribute the image for this new release cycle to a predetermined subset of the field nodes. Such an update may be referred to as a branching update. After a field node receives, verifies, and installs a branching update, the field node may then follow a different secure update sequence than field nodes which did not receive the branching update, with different keys and software images.

As indicate above, a software source 90 under the control of the software provider may use package creator 92 to create each update package 94 to be deployed to field node 20. Accordingly, the field node may be considered a first party and the software provider may be considered a second party. Some embodiments also enable the original software provider to transfer or delegate ownership or management responsibility to a new software provider, such as an ISV. The new software provider may be considered a third party. For example, the original software provider may use a special AK to cross-sign a software image from the ISV. For purposes of this disclosure, an image or package may be referred to as cross-signed when that package is signed by one party, but it includes one or more AKs from a different party. Cross signing enables a field node that is controlled by one party (e.g., the original software provider) to switch into being controlled by a different party (e.g., the ISV), as a result of adopting a "foreign" update, along with the AKs in that update from the new owner. Also, the digital signature on a cross-signed update package may be referred to as a delegational digital signature.

In one example, the original software provider wants to distribute an update with a software image from an ISV, and the software provider also wants to delegate responsibility for future software updates to that ISV. To facilitate the delegation, the ISV may supply software source 90 with the new software image and with a new set of AKs that correspond to private keys generated by the ISV. (The new software image may also include a digital signature that was generated using a private key of the ISV, and any field nodes that are already being managed by the ISV may use that signature to validate the update.) Software source 90 may use package creator 92 to include that new software image and those AKs in update package 94, and package creator 92 may sign that package using the private component of an AK that was previously generated by the software provider and distributed to the field node. In other words, the software provider may distribute a cross-signed update package with a delegational digital signature. When the field node or endpoint receives the cross-signed package, the field node may determine that the image should be trusted, in response to determining that the image was signed with an AK that was previously provided to the field node by the software provider. Consequently, the field node may save the AKs from that package (which were generated by the ISV) for use when verifying future updates. Since those AKs are owned by a new entity, the field node has effectively switched ownership and is now managed by that new entity (i.e., the ISV) until the new entity decides to cross-sign a different secure update chain.

In the same way, software source 90 may manage multiple varieties or flavors of MCU software with corresponding arrangements of releases and AKs, such as those illustrated in FIG. 2. Hence the cross-signing flow also enables software manager 42 to switch between available software sources of the same owner/entity.

In alternative embodiments, the current software source (e.g., the original equipment manufacturer (OEM) of the data processing system) may use other techniques to delegate responsibility for future updates to a new software source (e.g., an ISV). For instance, the OEM may provide an update package containing one or more AKs from the OEM and one or more AKs from the ISV, and the OEM may then use one of the AKs from the ISV. In this case, however, the OEM may need to know which of the several AKs of the ISV (e.g., the minor update key, the major update key, or a reserved/special key) will actually be used for the next update, and the delegation may happen only after that key is actually used by the ISV to sign a new package.

In another embodiment, the old provider deploys all AKs as usual. At any time, the old provider may decide to use one of the private keys matching a currently deployed AK to sign a package of the new provider (possibly resulting in two signatures on that package, one by the old provider and one by the new provider). The device with keys from old provider will accept that package immediately, and the extracted and stored AKs of that package will all be owned by the new provider.

As has been described, a software provider may provide AKs in update packages signed with CKs, and field nodes may use previously received AKs to validate such update packages.

For purposes of illustration, the present disclosure describes one or more example embodiments, but the present teachings are not limited to those particular embodiments. Other configurations are contemplated. In light of the principles and example embodiments described and illustrated herein, it will be recognized that the illustrated embodiments can be modified in arrangement and detail without departing from such principles. Also, even though expressions such as "an embodiment," "one embodiment," "another embodiment," or the like are used herein, these phrases are meant to generally reference embodiment possibilities, and are not intended to limit the invention to particular embodiment configurations. As used herein, these phrases may reference the same embodiment or different embodiments, and those embodiments are combinable into other embodiments.

Any suitable operating environment and programming language (or combination of operating environments and programming languages) may be used to implement components described herein. As indicated above, the present teachings may be used to advantage in many different kinds of data processing systems. Example data processing systems include, without limitation, SoCs, MCUs, wearable devices, handheld devices, smartphones, telephones, entertainment devices such as audio devices, video devices, audio/video devices (e.g., televisions and set top boxes), vehicular processing systems, personal digital assistants (PDAs), tablet computers, laptop computers, portable computers, personal computers (PCs), workstations, servers, client-server systems, distributed computing systems, supercomputers, high-performance computing systems, computing clusters, mainframe computers, mini-computers, and other devices for processing or transmitting information. Accordingly, unless explicitly specified otherwise or required by the context, references to any particular type of data processing system (e.g., an SoC) should be understood as encompassing other types of data processing systems, as well. Also, unless expressly specified otherwise, components that are described as being coupled to each other, in communication with each other, responsive to each other, or the like need not be in continuous communication with each other and need not be directly coupled to each other. Likewise, when one component is described as receiving data from or sending data to another component, that data may be sent or received through one or more intermediate components, unless expressly specified otherwise. In addition, some components of the data processing system may be implemented as adapter cards with interfaces (e.g., a connector) for communicating with a bus. Alternatively, devices or components may be implemented as embedded controllers, using components such as programmable or non-programmable logic devices or arrays, application-specific integrated circuits (ASICs), embedded computers, smart cards, and the like. For purposes of this disclosure, the term "bus" includes pathways that may be shared by more than two devices, as well as point-to-point pathways. Also, for purpose of this disclosure, a processor may also be referred to as a processing unit, a processing element, a central processing unit (CPU), etc.

This disclosure may refer to instructions, functions, procedures, data structures, application programs, microcode, configuration settings, and other kinds of data. As described above, when the data is accessed by a machine or device, the machine or device may respond by performing tasks, defining abstract data types or low-level hardware contexts, and/or performing other operations. For instance, data storage, random access memory (RAM), and/or flash memory may include various sets of instructions which, when executed, perform various operations. Such sets of instructions may be referred to in general as software. In addition, the term "program" may be used in general to cover a broad range of software constructs, including applications, routines, modules, drivers, subprograms, processes, and other types of software components. Also, applications and/or other data that are described above as residing on a particular device in one example embodiment may, in other embodiments, reside on one or more other devices. And computing operations that are described above as being performed on one particular device in one example embodiment may, in other embodiments, be executed by one or more other devices.

It should also be understood that the hardware and software components depicted herein represent functional elements that are reasonably self-contained so that each can be designed, constructed, or updated substantially independently of the others. In alternative embodiments, many of the components may be implemented as hardware, software, or combinations of hardware and software for providing the functionality described and illustrated herein. For example, alternative embodiments include machine accessible media encoding instructions or control logic for performing the operations of the invention. Such embodiments may also be referred to as program products. Such machine accessible media may include, without limitation, tangible storage media such as magnetic disks, optical disks, RAM, read only memory (ROM), etc., as well as processors, controllers, and other components that include RAM, ROM, and/or other storage facilities. For purposes of this disclosure, the term "ROM" may be used in general to refer to non-volatile memory devices such as erasable programmable ROM (EPROM), electrically erasable programmable ROM (EEPROM), flash ROM, flash memory, etc. In some embodiments, some or all of the control logic for implementing the described operations may be implemented in hardware logic (e.g., as part of an integrated circuit chip, a programmable gate array (PGA), an ASIC, etc.). In at least one embodiment, the instructions for all components may be stored in one non-transitory machine accessible medium. In at least one other embodiment, two or more non-transitory machine accessible media may be used for storing the instructions for the components. For instance, instructions for one component may be stored in one medium, and instructions another component may be stored in another medium. Alternatively, a portion of the instructions for one component may be stored in one medium, and the rest of the instructions for that component (as well instructions for other components), may be stored in one or more other media. Instructions may also be used in a distributed environment, and may be stored locally and/or remotely for access by single or multi-processor machines.

Also, although one or more example processes have been described with regard to particular operations performed in a particular sequence, numerous modifications could be applied to those processes to derive numerous alternative embodiments of the present invention. For example, alternative embodiments may include processes that use fewer than all of the disclosed operations, process that use additional operations, and processes in which the individual operations disclosed herein are combined, subdivided, rearranged, or otherwise altered.

In view of the wide variety of useful permutations that may be readily derived from the example embodiments described herein, this detailed description is intended to be illustrative only, and should not be taken as limiting the scope of coverage.

The following examples pertain to further embodiments.

Example A1 is a data processing system with support for validation of software updates. The data processing system comprises storage, a processor in communication with the storage, a communications port in communication with the processor, and a software manager in the storage. When the software manager is executed by the processor, the software manager enables the data processing system to (a) save a current version of a software component in the storage; (b) save at least first and second current advance keys (AKs) in the storage; (c) after saving the current AKs in the storage, receive via the communications port an update package for a new version of the software component; (d) extract a digital signature from the update package; (e) extract at least first and second new AKs from the update package; and (f) use at least one current AK to determine whether the digital signature is valid. Also, in response to a determination that the digital signature is valid, the software manager enables the data processing system to use a software image from the update package to update the software component and to save the new AKs, for subsequent utilization as the current AKs.

Example A2 includes the features of example A1, and the software manager enables the data processing system to automatically use the second current AK to determine whether the digital signature is valid, in response to validation failure with the first current AK.

Example A3 includes the features of example A1, and the first current AK comprises a hash of a public key. Also, the software manager enables the data processing system to extract a plaintext version of the public key from the update package. Also, the operation of using at least one current AK to determine whether the digital signature is valid comprises (a) generating a new key hash by hashing the plaintext version of the public key; (b) determining whether the new key hash matches the first current AK; and (c) in response to a determination that the new key hash matches the first current AK, using the plaintext version of the public key to determine whether the digital signature was generated using a private key that corresponds to the public key. Example A3 may also include the features of Example A2.

Example A4 includes the features of example A1, further with support for fast path updates. The first current AK comprises an advance minor update key. The second current AK comprises an advance major update key. The software manager further enables the data processing system to (a) automatically apply a minor software update if the digital signature is found valid with the minor update key; and (b) automatically apply a major software update if the digital signature is found valid with the major update key. Example A4 may also include the features of any one or more of Examples A2 and A3.

Example A5 includes the features of example A4, further with support for delegation among software providers. The current version of the software component in the data processing system comprises a current image from a current software provider. The new version of the software component in the update package comprises a new image from a new software provider. At least one of the current AKs comprises an AK from the current software provider. At least one of the new AKs comprises an AK from the new software provider. Also, the operation of saving the new AKs, for subsequent utilization as the current AKs, comprises saving the AK from the new software provider, for subsequent utilization as the current AK. Example A5 may also include the features of any one or more of Examples A2 and A3.

Example A6 includes the features of example A1, further with support for image recovery after an update. The software image from the update package comprises a version N image. The current AK that was successfully used to validate the digital signature for the update package with the version N image comprises an $AK_N$. The new AKs comprise at least one $AK_{N+1}$. Also, the software manager further enables the data processing system to (a) in addition to saving the $AK_{N+1}$ in the data processing system as one of the current AKs, save $AK_N$ in the data processing system as a recovery key; (b) after using the software image from the update package to update the software component, use $AK_N$ to re-validate the update package; and (c) after using $AK_N$ to re-validate the update package, re-apply the software image from the update package to the software component. Example A6 may also include the features of any one or more of Examples A2 through A5.

Example A7 includes the features of example A1, further with support for image rollback after an update. The software image from the update package comprises a version N image. The current AK that was successfully used to validate the digital signature for the update package with the version N image comprises an $AK_N$. The new AKs comprise at least one $AK_{N+1}$. Also, the software manager further enables the data processing system to (a) in addition to saving the $AK_{N+1}$ in the data processing system as one of the current AKs, save a previous $AK_{N-1}$ in the data processing system as a rollback key; (b) after using the software image from the update package to update the software component, use $AK_{N-1}$ to re-validate a previous update package; and (c) after using $AK_{N-1}$ to re-validate the previous update package, re-apply a software image from the previous update package to the software component. Example A7 may also include the features of any one or more of Examples A2 through A6.

Example A8 includes the features of example A1, further with support for delegation among software providers. The current version of the software component in the data processing system comprises a current image from a current software provider. The new version of the software component in the update package comprises a new image from a new software provider. At least one of the current AKs comprises an AK from the current software provider. At least one of the new AKs comprises an AK from the new software provider. Also, the operation of saving the new AKs, for subsequent utilization as the current AKs, comprises saving the AK from the new software provider, for subsequent utilization as the current AK. Example A7 may also include the features of any one or more of Examples A2 through A7.

Example B1 is an apparatus with support for validation of software updates. The apparatus comprises at least one non-transitory machine-accessible storage medium and a software manager in the machine-accessible storage medium. When the software manager is executed by a processor of a data processing system, the software manager enables the data processing system to (a) save a current version of a software component in the machine-accessible storage medium; (b) save at least first and second current advance keys (AKs) in the machine-accessible storage medium; (c) after saving the current AKs in the machine-accessible storage medium, receive an update package for a new version of the software component; (d) extract a digital signature from the update package; (e) extract at least first and second new AKs from the update package; and (f) use at least one current AK to determine whether the digital signature is valid. Also, in response to a determination that the digital signature is valid, the software manager enables the data processing system to use a software image from the update package to update the software component and to save the new AKs, for subsequent utilization as the current AKs.

Example B2 includes the features of example B1, and the software manager enables the data processing system to automatically use the second current AK to determine whether the digital signature is valid, in response to validation failure with the first current AK.

Example B3 includes the features of example B1, and the first current AK comprises a hash of a public key. Also, the software manager enables the data processing system to extract a plaintext version of the public key from the update package. Also, the operation of using at least one current AK to determine whether the digital signature is valid comprises (a) generating a new key hash by hashing the plaintext version of the public key; (b) determining whether the new key hash matches the first current AK; and (c) in response to a determination that the new key hash matches the first current AK, using the plaintext version of the public key to determine whether the digital signature was generated using a private key that corresponds to the public key. Example A3 may also include the features of Example A2.

Example B4 includes the features of example B1, further with support for fast path updates. The first current AK comprises an advance minor update key. The second current AK comprises an advance major update key. The software manager further enables the data processing system to (a) automatically apply a minor software update if the digital signature is found valid with the minor update key; and (b) automatically apply a major software update if the digital signature is found valid with the major update key. Example B4 may also include the features of any one or more of Examples B2 and B3.

Example B5 includes the features of example B4, further with support for delegation among software providers. The current version of the software component in the data processing system comprises a current image from a current software provider. The new version of the software component in the update package comprises a new image from a new software provider. At least one of the current AKs comprises an AK from the current software provider. At least one of the new AKs comprises an AK from the new software provider. Also, the operation of saving the new AKs, for subsequent utilization as the current AKs, comprises saving the AK from the new software provider, for subsequent utilization as the current AK. Example B5 may also include the features of any one or more of Examples B2 and B3.

Example B6 includes the features of example B1, further with support for image recovery after an update. The software image from the update package comprises a version N image. The current AK that was successfully used to validate the digital signature for the update package with the version N image comprises an $AK_N$. The new AKs comprise at least one $AK_{N+1}$. Also, the software manager further enables the data processing system to (a) in addition to saving the $AK_{N+1}$ in the data processing system as one of the current AKs, save $AK_N$ in the data processing system as a recovery key; (b) after using the software image from the update package to update the software component, use $AK_N$ to re-validate the update package; and (c) after using $AK_N$ to re-validate the update package, re-apply the software image from the update package to the software component. Example B6 may also include the features of any one or more of Examples B2 through B5.

Example B7 includes the features of example B1, further with support for image rollback after an update. The software image from the update package comprises a version N image. The current AK that was successfully used to validate the digital signature for the update package with the version N image comprises an $AK_N$. The new AKs comprise at least one $AK_{N+1}$. Also, the software manager further enables the data processing system to (a) in addition to saving the $AK_{N+1}$ in the data processing system as one of the current AKs, save a previous $AK_{N-1}$ in the data processing system as a rollback key; (b) after using the software image from the update package to update the software component, use $AK_{N-1}$ to re-validate a previous update package; and (c) after using $AK_{N-1}$ to re-validate the previous update package, re-apply a software image from the previous update package to the software component. Example B7 may also include the features of any one or more of Examples B2 through B6.

Example B8 includes the features of example B1, further with support for delegation among software providers. The current version of the software component in the data processing system comprises a current image from a current software provider. The new version of the software component in the update package comprises a new image from a new software provider. At least one of the current AKs comprises an AK from the current software provider. At least one of the new AKs comprises an AK from the new software provider. Also, the operation of saving the new AKs, for subsequent utilization as the current AKs, comprises saving the AK from the new software provider, for subsequent utilization as the current AK. Example B7 may also include the features of any one or more of Examples B2 through B7.

Example C1 is a method for validating software updates for a data processing system. The method comprises (a) saving at least first and second current advance keys (AKs) in a data processing system that contains a current version of a software component; (b) after saving the current AKs in the data processing system, receiving, at the data processing system, an update package for a new version of the software component; (c) extracting a digital signature from the update package; (d) extracting at least first and second new AKs from the update package; and (e) using at least one current AK to determine whether the digital signature is valid. Also, in response to a determination that the digital signature is valid, the data processing system (a) uses a software image from the update package to update the software component, and (b) saves the new AKs, for subsequent utilization as the current AKs.

Example C2 includes the features of example C1, and the operation of using at least one current AK to determine whether the digital signature is valid comprises automatically using the second current AK to determine whether the digital signature is valid, in response to validation failure with the first current AK.

Example C3 includes the features of example C1, and the first current AK comprises a hash of a public key. Also, the method further comprises extracting a plaintext version of the public key from the update package. Also, the operation of using at least one current AK to determine whether the digital signature is valid comprises (a) generating a new key hash by hashing the plaintext version of the public key; (b) determining whether the new key hash matches the first current AK; and (c) in response to a determination that the new key hash matches the first current AK, using the plaintext version of the public key to determine whether the digital signature was generated using a private key that corresponds to the public key. Example C3 may also include the features of Example C2.

Example C4 includes the features of example C1 and further provides for fast path updates. The first current AK comprises an advance minor update key. The second current AK comprises an advance major update key. Also, the method further comprises (a) automatically applying a minor software update if the digital signature is found valid with the minor update key; and (b) automatically applying a major software update if the digital signature is found valid with the major update key. Example C4 may also include the features of any one or more of Examples C2 and C3.

Example C5 includes the features of example C4 and further provides for delegation among software providers. The current version of the software component in the data processing system comprises a current image from a current software provider. The new version of the software component in the update package comprises a new image from a new software provider. At least one of the current AKs comprises an AK from the current software provider. At least one of the new AKs comprises an AK from the new software provider. Also, the operation of saving the new AKs, for subsequent utilization as the current AKs, comprises saving the AK from the new software provider, for subsequent utilization as the current AK. Example C5 may also include the features of any one or more of Examples C2 and C3.

Example C6 includes the features of example C1 and further provides for image recovery after an update. The software image from the update package comprises a version N image. The current AK that was successfully used to validate the digital signature for the update package with the version N image comprises an $AK_N$. The new AKs comprise at least one $AK_{N+1}$. Also, the method further comprises (a) in addition to saving the $AK_{N+1}$ in the data processing system as one of the current AKs, saving $AK_N$ in the data processing system as a recovery key; (b) after using the software image from the update package to update the software component, using $AK_N$ to re-validate the update package; and (c) after using $AK_N$ to re-validate the update package, re-applying the software image from the update package to the software component. Example C6 may also include the features of any one or more of Examples C2 through C5.

Example C7 includes the features of example C1 and further provides for image rollback after an update. The software image from the update package comprises a version N image. The current AK that was successfully used to validate the digital signature for the update package with the version N image comprises an $AK_N$. The new AKs comprise at least one $AK_{N+1}$. Also, the method further comprises (a) in addition to saving the $AK_{N+1}$ in the data processing system as one of the current AKs, saving a previous $AK_{N-1}$ in the data processing system as a rollback key; (b) after using the software image from the update package to update the software component, using $AK_{N-1}$ to re-validate a previous update package; and (c) after using $AK_{N-1}$ to re-validate the previous update package, re-applying a software image from the previous update package to the software component. Example C7 may also include the features of any one or more of Examples C2 through C6.

Example C8 includes the features of example C1 and further provides for delegation among software providers. The current version of the software component in the data processing system comprises a current image from a current software provider. The new version of the software component in the update package comprises a new image from a new software provider. At least one of the current AKs comprises an AK from the current software provider. At least one of the new AKs comprises an AK from the new software provider. Also, the operation of saving the new AKs, for subsequent utilization as the current AKs, comprises saving the AK from the new software provider, for subsequent utilization as the current AK. Example C8 may also include the features of any one or more of Examples C2 through C6.

Example D1 is a method for generating a verifiably trustworthy software update package. The method comprises (a) generating at least first and second public/private key pairs at a data processing system; and (b) generating a first update package comprising (i) a first version of a software component; and (ii) at least first and second current advance keys (AKs), wherein the first and second current AKs are based on public key components of the first and second public/private key pairs, respectively. The method further comprises (c) making the first update package available to at least one field node; (d) generating at least third and fourth public/private key pairs at the data processing system; (e) after generating the first update package, generating a second update package comprising a second version of the software component, and at least first and second new AKs, wherein the first and second new AKs are based on public key components of the third and fourth public/private key pairs, respectively; (f) using a private key component from the first or second public/private key pair to generate a digital signature for the second update package; (g) including the digital signature with the second update package; and (h) making the second update package available to the field node.

Example D2 includes the features of example D1 and further comprises (a) receiving a third version of the software component from a third party; (b) receiving a fifth AK from the third party, wherein the fifth AK is based on a private key belonging to the third party; (c) generating a third update package comprising (i) the third version of the software component; and (ii) the fifth AK from the third party; (d) using a private key component from the third or fourth public/private key pair to generate a delegational digital signature for the third update package; (e) including the delegational digital signature with the third update package; and (f) making the third update package available to the field node.

Example E is at least one machine-accessible medium comprising computer instructions for validating software updates for a data processing system, wherein the computer instructions, in response to being executed on the data processing system, enable the data processing system to perform a method according to any of Examples C1 through D2.

Example F is a data processing system with support for validating software updates. The data processing system comprises (a) a processing element; (b) at least one machine-accessible medium responsive to the processing element; and (c) computer instructions stored at least partially in the at least one machine-accessible medium, wherein the computer instructions, in response to being executed, enable the data processing system to perform a method according to any of Examples C1 through D2.

Example G is a data processing system with support for validating software updates. The data processing system comprises means for performing the method of any one of Examples C1 through D2.

What is claimed is:

1. A data processing system with support for validation of software updates, the data processing system comprising:
   storage;
   a processor in communication with the storage;
   a communications port in communication with the processor, and
   a software manager in the storage, wherein the software manager, when executed by the processor, enables the data processing system to:
      save a current version of a software component in the storage;
      save at least first and second current advance keys (AKs) in the storage;
      after saving the current AKs in the storage, receive via the communications port an update package for a new version of the software component;
      extract a digital signature from the update package;
      extract at least first and second new AKs from the update package, wherein the first and second new AKs are indicative of a key pair used to sign a version of the software component subsequent to the new version of the software component;
      use at least one current AK to determine whether the digital signature is valid; and
      in response to a determination that the digital signature is valid:
         use a software image from the update package to update the software component; and
         save the new AKs, for subsequent utilization as the current AKs.

2. A data processing system according to claim 1, wherein the software manager enables the data processing system to automatically use the second current AK to determine whether the digital signature is valid, in response to validation failure with the first current AK.

3. A data processing system according to claim 1, wherein:
   the first current AK comprises a hash of a public key;
   the software manager further enables the data processing system to extract a plaintext version of the public key from the update package; and the operation of using at least one current AK to determine whether the digital signature is valid comprises:
generating a new key hash by hashing the plaintext version of the public key;
determining whether the new key hash matches the first current AK; and
in response to a determination that the new key hash matches the first current AK, using the plaintext version of the public key to determine whether the digital signature was generated using a private key that corresponds to the public key.

4. A data processing system according to claim 1, further with support for fast path updates, wherein:
the first current AK comprises an advance minor update key;
the second current AK comprises an advance major update key; and
the software manager further enables the data processing system to:
automatically apply a minor software update if the digital signature is found valid with the minor update key; and
automatically apply a major software update if the digital signature is found valid with the major update key.

5. A data processing system according to claim 4, further with support for delegation among software providers, wherein:
the current version of the software component in the data processing system comprises a current image from a current software provider;
the new version of the software component in the update package comprises a new image from a new software provider;
at least one of the current AKs comprises an AK from the current software provider;
at least one of the new AKs comprises an AK from the new software provider; and
the operation of saving the new AKs, for subsequent utilization as the current AKs, comprises saving the AK from the new software provider, for subsequent utilization as the current AK.

6. A data processing system according to claim 1, further with support for image recovery after an update, wherein:
the software image from the update package comprises a version N image;
the current AK that was successfully used to validate the digital signature for the update package with the version N image comprises an $AK_N$;
the new AKs comprise at least one $AK_{N+1}$; and
the software manager further enables the data processing system to:
in addition to saving the $AK_{N+1}$ in the data processing system as one of the current AKs, save $AK_N$ in the data processing system as a recovery key;
after using the software image from the update package to update the software component, use $AK_N$ to re-validate the update package; and
after using $AK_N$ to re-validate the update package, re-apply the software image from the update package to the software component.

7. An apparatus with support for validation of software updates, the apparatus comprising:
at least one non-transitory machine-accessible storage medium; and
a software manager in the machine-accessible storage medium which, when executed by a processor of a data processing system, enables the data processing system to:
save a current version of a software component in the machine-accessible storage medium;
save at least first and second current advance keys (AKs) in the machine-accessible storage medium;
after saving the current AKs in the machine-accessible storage medium, receive an update package for a new version of the software component;
extract a digital signature from the update package;
extract at least first and second new AKs from the update package, wherein the first and second new AKs are indicative of a key pair used to sign a version of the software component subsequent to the new version of the software component;
use at least one current AK to determine whether the digital signature is valid;
in response to a determination that the digital signature is valid:
use a software image from the update package to update the software component; and
save the new AKs, for subsequent utilization as the current AKs.

8. An apparatus according to claim 7, wherein the software manager enables the data processing system to automatically use the second current AK to determine whether the digital signature is valid, in response to validation failure with the first current AK.

9. An apparatus according to claim 7, wherein:
the first current AK comprises a hash of a public key;
the software manager further enables the data processing system to extract a plaintext version of the public key from the update package; and
the operation of using at least one current AK to determine whether the digital signature is valid comprises:
generating a new key hash by hashing the plaintext version of the public key;
determining whether the new key hash matches the first current AK; and
in response to a determination that the new key hash matches the first current AK, using the plaintext version of the public key to determine whether the digital signature was generated using a private key that corresponds to the public key.

10. An apparatus according to claim 7, further with support for fast path updates, wherein:
the first current AK comprises an advance minor update key;
the second current AK comprises an advance major update key; and
the software manager further enables the data processing system to:
automatically apply a minor software update if the digital signature is found valid with the minor update key; and
automatically apply a major software update if the digital signature is found valid with the major update key.

11. An apparatus according to claim 10, further with support for delegation among software providers, wherein:
the current version of the software component in the data processing system comprises a current image from a current software provider;

the new version of the software component in the update package comprises a new image from a new software provider;
at least one of the current AKs comprises an AK from the current software provider;
at least one of the new AKs comprises an AK from the new software provider; and
the operation of saving the new AKs, for subsequent utilization as the current AKs, comprises saving the AK from the new software provider, for subsequent utilization as the current AK.

12. An apparatus according to claim 7, further with support for image recovery after an update, wherein:
the software image from the update package comprises a version N image;
the current AK that was successfully used to validate the digital signature for the update package with the version N image comprises an $AK_N$;
the new AKs comprise at least one $AK_{N+1}$; and
the software manager further enables the data processing system to:
in addition to saving the $AK_{N+1}$ in the data processing system as one of the current AKs, save $AK_N$ in the data processing system as a recovery key;
after using the software image from the update package to update the software component, use $AK_N$ to re-validate the update package; and
after using $AK_N$ to re-validate the update package, re-apply the software image from the update package to the software component.

13. An apparatus according to claim 7, further with support for delegation among software providers, wherein:
the current version of the software component in the data processing system comprises a current image from a current software provider;
the new version of the software component in the update package comprises a new image from a new software provider;
at least one of the current AKs comprises an AK from the current software provider;
at least one of the new AKs comprises an AK from the new software provider; and
the operation of saving the new AKs, for subsequent utilization as the current AKs, comprises saving the AK from the new software provider, for subsequent utilization as the current AK.

14. A method for validating software updates for a data processing system, the method comprising:
saving at least first and second current advance keys (AKs) in a data processing system that contains a current version of a software component;
after saving the current AKs in the data processing system, receiving, at the data processing system, an update package for a new version of the software component;
extracting a digital signature from the update package;
extracting at least first and second new AKs from the update package, wherein the first and second new AKs are indicative of a key pair used to sign a version of the software component subsequent to the new version of the software component;
using at least one current AK to determine whether the digital signature is valid; and
in response to a determination that the digital signature is valid:
using a software image from the update package to update the software component; and
saving the new AKs, for subsequent utilization as the current AKs.

15. A method according to claim 14, wherein:
the first current AK comprises a hash of a public key;
the method further comprises extracting a plaintext version of the public key from the update package; and
the operation of using at least one current AK to determine whether the digital signature is valid comprises:
generating a new key hash by hashing the plaintext version of the public key;
determining whether the new key hash matches the first current AK; and
in response to a determination that the new key hash matches the first current AK, using the plaintext version of the public key to determine whether the digital signature was generated using a private key that corresponds to the public key.

16. A method according to claim 14, further providing for fast path updates, wherein:
the first current AK comprises an advance minor update key;
the second current AK comprises an advance major update key; and
the method further comprises:
automatically applying a minor software update if the digital signature is found valid with the minor update key; and
automatically applying a major software update if the digital signature is found valid with the major update key.

17. A method according to claim 16, further providing for delegation among software providers, wherein:
the current version of the software component in the data processing system comprises a current image from a current software provider;
the new version of the software component in the update package comprises a new image from a new software provider;
at least one of the current AKs comprises an AK from the current software provider;
at least one of the new AKs comprises an AK from the new software provider; and
the operation of saving the new AKs, for subsequent utilization as the current AKs, comprises saving the AK from the new software provider, for subsequent utilization as the current AK.

18. A method according to claim 14, further providing for image recovery after an update, wherein:
the software image from the update package comprises a version N image;
the current AK that was successfully used to validate the digital signature for the update package with the version N image comprises an $AK_N$;
the new AKs comprise at least one $AK_{N+1}$; and
the method further comprises:
in addition to saving the $AK_{N+1}$ in the data processing system as one of the current AKs, saving $AK_N$ in the data processing system as a recovery key;
after using the software image from the update package to update the software component, using $AK_N$ to re-validate the update package; and
after using $AK_N$ to re-validate the update package, re-applying the software image from the update package to the software component.

19. A method according to claim 14, further providing for delegation among software providers, wherein:

the current version of the software component in the data processing system comprises a current image from a current software provider;

the new version of the software component in the update package comprises a new image from a new software provider;

at least one of the current AKs comprises an AK from the current software provider;

at least one of the new AKs comprises an AK from the new software provider; and the operation of saving the new AKs, for subsequent utilization as the current AKs, comprises saving the AK from the new software provider, for subsequent utilization as the current AK.

20. A method for generating a verifiably trustworthy software update package, the method comprising:

generating at least first and second public/private key pairs at a data processing system;

generating a first update package comprising:
 a first version of a software component; and
 at least first and second current advance keys (AKs), wherein the first and second current AKs are based on public key components of the first and second public/private key pairs, respectively;

making the first update package available to at least one field node;

generating at least third and fourth public/private key pairs at the data processing system;

after generating the first update package, generating a second update package comprising:
 a second version of the software component; and
 at least first and second new AKs, wherein the first and second new AKs are based on public key components of the third and fourth public/private key pairs, respectively;

using a private key component from the first or second public/private key pair to generate a digital signature for the second update package;

including the digital signature with the second update package; and making the second update package available to the field node.

21. A method according to claim 20, further comprising:

receiving a third version of the software component from a third party;

receiving a fifth AK from the third party, wherein the fifth AK is based on a private key belonging to the third party;

generating a third update package comprising:
 the third version of the software component; and
 the fifth AK from the third party;

using a private key component from the third or fourth public/private key pair to generate a delegational digital signature for the third update package;

including the delegational digital signature with the third update package; and making the third update package available to the field node.

* * * * *